United States Patent [19]
Prokup

[11] Patent Number: 5,724,028
[45] Date of Patent: Mar. 3, 1998

[54] RF REMOTE SYSTEM WITH DRIVE-AWAY PREVENTION

[75] Inventor: James M. Prokup, Westland, Mich.

[73] Assignee: United Technologies Automotive, Inc., Dearborn, Mich.

[21] Appl. No.: 868,327

[22] Filed: Jun. 3, 1997

Related U.S. Application Data

[63] Continuation of Ser. No. 360,644, Dec. 21, 1994, abandoned.

[51] Int. Cl.$^6$ ..................................................... H04Q 1/00
[52] U.S. Cl. .............................. 340/825.31; 340/825.54; 340/825.69; 340/825.72; 342/42
[58] Field of Search ....................... 340/825.31, 825.34, 340/825.69, 825.72, 825.54; 342/42, 44

[56] References Cited

U.S. PATENT DOCUMENTS

| | | |
|---|---|---|
| 4,596,985 | 6/1986 | Bongard et al. |
| 4,758,835 | 7/1988 | Rathmann et al. |
| 4,847,614 | 7/1989 | Keller. |
| 5,105,162 | 4/1992 | Fleissner et al. |
| 5,109,152 | 4/1992 | Takagi et al. |
| 5,109,221 | 4/1992 | Lambropoulos et al. |
| 5,115,236 | 5/1992 | Kohler. |
| 5,144,667 | 9/1992 | Pogue, Jr. et al. |
| 5,191,610 | 3/1993 | Hill et al. |
| 5,280,267 | 1/1994 | Reggiani. |
| 5,287,112 | 2/1994 | Schuermann ................ 342/42 |
| 5,319,364 | 6/1994 | Waraksa et al. |
| 5,442,341 | 8/1995 | Lambropoulos ........... 340/825.31 |
| 5,461,386 | 10/1995 | Knebelkamp .............. 340/825.31 |
| 5,467,082 | 11/1995 | Sanderson ................ 340/825.31 |
| 5,519,386 | 5/1996 | Tobergte .................. 340/825.31 |

FOREIGN PATENT DOCUMENTS 2253859  5/1974  Germany.

OTHER PUBLICATIONS

FCC Documentation, General Motors Corporation, AB00202T.

*Primary Examiner*—Brian Zimmerman

[57] ABSTRACT

A drive-away prevention security system used in connection with an RF remote keyless entry system. A microprocessor and associated circuitry are configured within the head of an ignition key for a vehicle such that when a function switch on the key head is activated, a coded signal is transmitted to be received by a receiver within the vehicle. The receiver deciphers the received coded transmission to determine if a valid signal has been transmitted, and performs a vehicle function, such as locking or unlocking the vehicle doors, if the coded signal is valid. When the ignition key is inserted in the ignition switch of the vehicle, an ignition signal is sent to a microprocessor associated with the receiver. The microprocessor causes an on/off signal to be applied to an oscillator at the ignition switch in accordance with a data scheme. The oscillator energizes a coil at the ignition switch that generates a time-varying magnetic field inductively coupling the magnetic field lines to the coil within the ignition key. The microprocessor in the key analyzes the data sequence transmitted by the time-varying magnetic field, and emits the coded signal if the time-varying magnetic field is valid. The receiver receives the coded beacon signal and causes a start/enable signal to be sent to an engine module if the signal is valid.

19 Claims, 2 Drawing Sheets

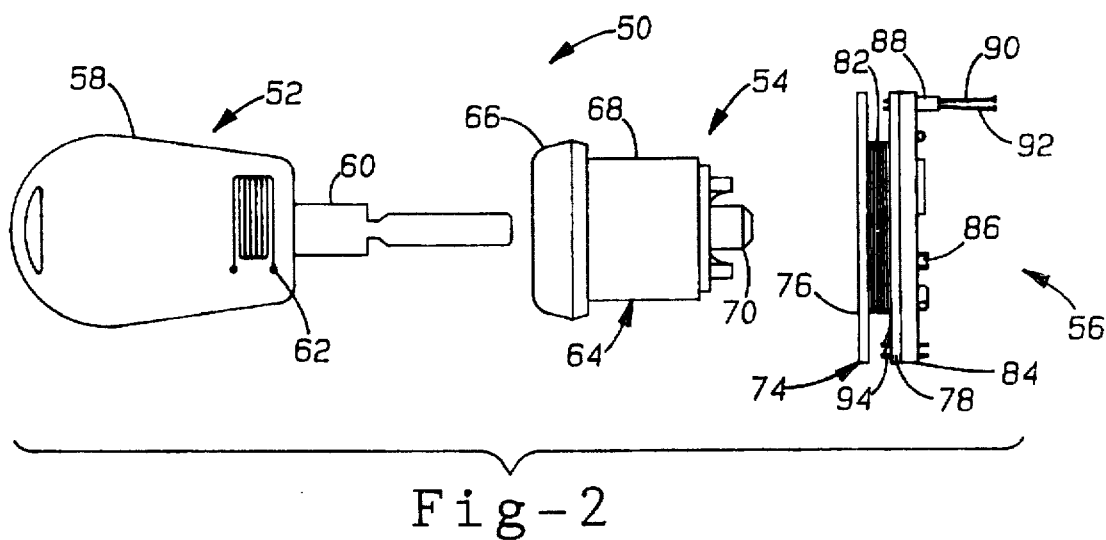
Fig-2
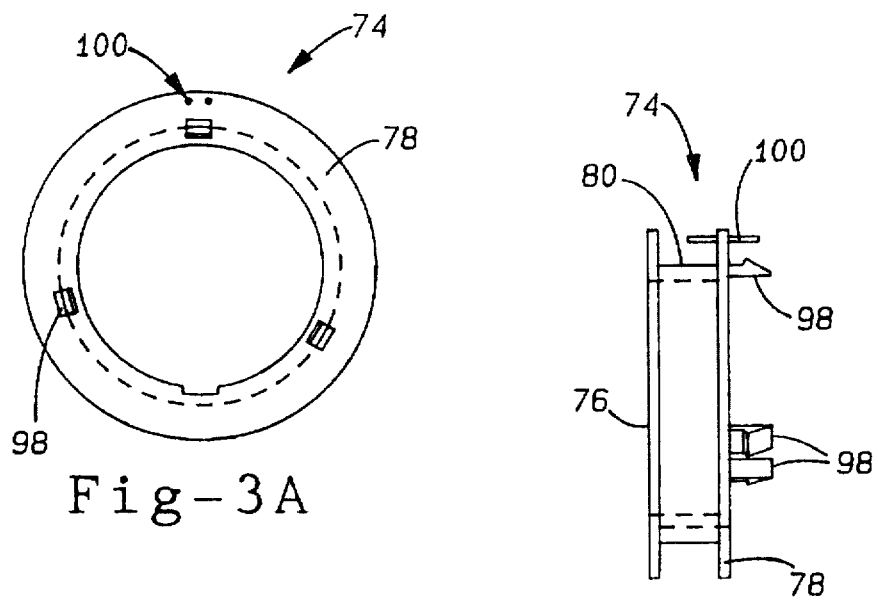
Fig-3A
Fig-3B
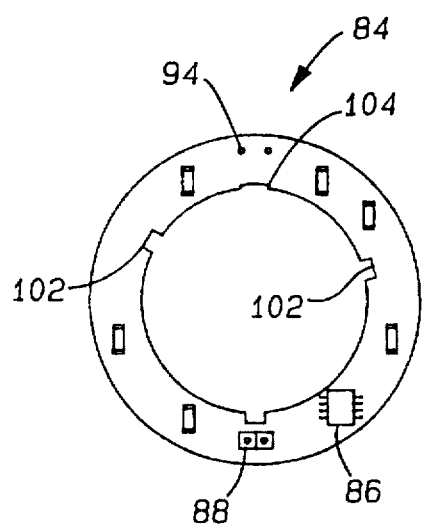
Fig-4

RF REMOTE SYSTEM WITH DRIVE-AWAY PREVENTION

This application is a continuation of application Ser. No. 08/360,644, filed Dec. 21, 1994, now abandoned.

BACKGROUND OF THE INVENTION

1. Field of the Invention

This invention relates generally to a drive-away prevention security system associated with a vehicle and, more particularly, to a system that remotely activates certain functions of a vehicle such as a vehicle door lock and unlock, and includes a subsystem for preventing vehicle ignition by an unauthorized user.

2. Discussion of the Related Art

Remote RF keyless entry systems for activating a vehicle function, such as locking and unlocking a vehicle door, or unlocking a vehicle trunk, from a remote location are known in the art. Remote keyless entry systems include a portable transmitter usually configured within an ignition key of the vehicle or attached as a key fob to a key chain carrying the ignition key of the vehicle. A vehicle operator will press a function button associated with the transmitter a distance from the vehicle in order to remotely activate the desired vehicle function. The transmitter will transmit an encoded signal that is received by an RF receiver within the vehicle if the transmitter is within the operating range of the system. The RF receiver will decode the signal, and if the receiver interprets that a valid coded signal has been received, will cause the desired function to be performed. In order to prevent a would-be thief from gaining access to the coded signal, and thus access to the vehicle, it has been known in the art to provide what has been referred to as "data encryption" codes where the coded signal is periodically updated in accordance with an encoding scheme.

Vehicle door locks can only be limitedly successful in preventing would-be thieves from gaining access to the vehicle. To provide further security, it is known in the art to provide some type of security mechanism which would prevent the would-be thief from activating the vehicle if he were to gain access to the vehicle. To this end, it may be desirable to provide a drive-away prevention vehicle security system that prevents an unauthorized vehicle user from activating a vehicle that can be used independently or in connection with an RF remote keyless entry system described above. It is therefore an object of the present invention to provide such a drive-away prevention security system.

SUMMARY OF THE INVENTION

In accordance with the teachings of the present invention, a drive-away prevention vehicle security system is disclosed that can be used in connection with a remote RF keyless entry system. When used in connection with a remote RF keyless entry system, a vehicle ignition key, or some type of key fob, is provided that encapsulates a transmitter circuit including a microprocessor and an RF oscillator circuit. Push-button function switches on the ignition key activate the microprocessor so as to cause the microprocessor to transmit stored encrypted data bits to the oscillator circuit to be imposed on a carrier frequency generated by the oscillator circuit. The carrier frequency is transmitted by an antenna within the ignition key and is received by an RF receiver within the vehicle. The RF receiver includes a microprocessor that deciphers and evaluates the coded transmission, and performs the encoded function if the coded signal is valid.

The ignition key also includes an induction coil as part of a drive-away prevention security system. When the key is inserted in the ignition switch of the vehicle, a switch in the ignition system of the vehicle is activated that causes an ignition signal to be applied to the microprocessor within the receiver. When the microprocessor receives the ignition signal, it transmits a signal to an oscillator circuit associated with a bobbin assembly encircling the ignition switch. The oscillator circuit causes power to be delivered to a coil wound on a bobbin of the bobbin assembly so as to generate a time-varying magnetic field through the coil on the bobbin. The magnetic field generated by the coil on the bobbin induces a current on the coil within the ignition key, which in turn activates the microprocessor within the key. The microprocessor within the receiver switches the signal applied to the oscillator circuit within the bobbin assembly on and off to generate a sequence of data bits. The microprocessor within the key deciphers the signal from the coil to determine if it is a valid signal. If the signal is valid, the microprocessor causes the oscillator circuit within the key to send the encoded signal to the receiver within the vehicle, so as to determine whether an authorized key is being inserted into the ignition switch. If the microprocessor determines that a valid key is being inserted into the ignition switch, it turns off the oscillator circuit which energizes the coil wound on the bobbin, and sends a signal to an electronic engine module to enable the vehicle to be activated.

Additional objects, advantages and features of the present invention will become apparent from the following description and appended claims, taken in conjunction with the accompanying drawings.

BRIEF DESCRIPTION OF THE DRAWINGS

FIG. 2 is a blown-apart side view of an ignition key, key cylinder assembly and bobbin assembly for the drive-away prevention security system according to an embodiment of the present invention;

FIG. 3(a) is a front view and FIG. 3(b) is a side view of a bobbin associated with the bobbin assembly of FIG. 2; and FIG. 4 is a front view of a printed circuit board associated with the bobbin assembly of FIG. 2.

DETAILED DESCRIPTION OF THE PREFERRED EMBODIMENTS

Figure 1:
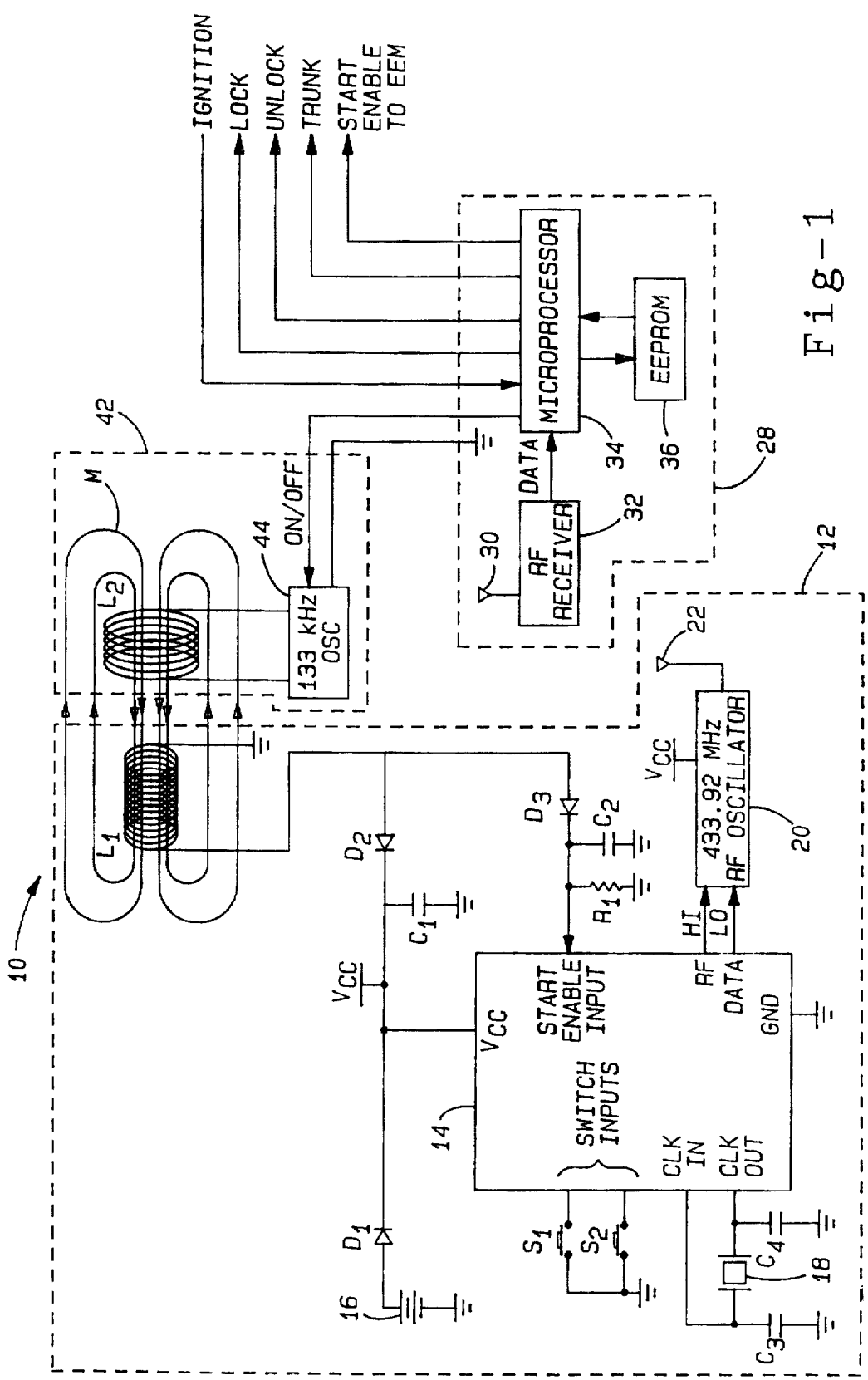
FIG. 1 is a schematic block diagram of an RF remote keyless entry system and associated drive-away prevention security system according to an embodiment of the present invention.

The following discussion of the preferred embodiments concerning a remote keyless entry system and associated drive-away prevention security system is merely exemplary in nature and is in no way intended to limit the invention or its applications or uses.

FIG. 1 shows a schematic block diagram of a remote keyless entry system and associated drive-away prevention security system 10 according to a preferred embodiment of the present invention. The system 10 includes an RF transponder unit 12 that includes an integrated circuit adaptable to be configured within the head of an ignition key (not shown in FIG. 1) associated with a vehicle (not shown). The unit 12 includes a microprocessor 14 that is powered by a voltage $V_{cc}$ supplied from a battery 16 through a rectifying diode $D_1$. A quartz crystal oscillator 18 provides a stable clock signal that controls the operation of the microprocessor 14. The frequency of the crystal oscillator 18 can be any frequency applicable for the purposes described herein. Capacitors $C_3$ and $C_4$ are connected between the input and ground, and the output and ground, respectively, of the crystal oscillator 18 in order to provide the necessary filtering, as is well understood in the art. First and second push-button function switches $S_1$ and $S_2$ provide signals to input pins of the microprocessor 14 that upon activation will cause the microprocessor 14 to access a stored function bit sequence to perform a predetermined function. An RF oscillator circuit 20 is connected to high and low RF data output pins of the microprocessor 14. The oscillator circuit 20 is shown here as a 433.92 MHz RF oscillator merely as an example in that other frequencies may be equally applicable. The RF oscillator circuit 20 will generate a carrier wave at its oscillation frequency that modulates the function bit sequence in a manner that will distinguish "0" and "1" bits so as to generate a coded signal. Different types of keying, such as frequency shift keying, amplitude shift keying, etc., can be used by the microprocessor 14 to distinguish the "0" and "1" as is well understood in the art. An output of the oscillator circuit 20 is applied to an antenna 22 in order to broadcast the coded signal.

The coded signals transmitted by the antenna 22 are received by an RF receiver and control unit 28. The control unit 28 is configured within the vehicle at a location that will effectively provide for receipt of the coded signal from the transponder unit 12. An antenna 30 associated with the unit 28 receives the coded signal from the antenna 22 and sends the coded signal to an RF receiver circuit 32. The RF receiver circuit 32 separates the data bits from the carrier frequency, in a manner well understood in the art, and then applies the data bit sequence to a microprocessor 34. The microprocessor 34 compares the data bits received from the transponder unit 12 with data bits stored in a memory device such as erasable programmable read only memory (EEPROM) 36 to determine if the received coded signal is valid. If the received coded signal coincides with one of the stored valid signals for a particular function, the microprocessor 34 will output a signal on the appropriate lock, unlock or trunk output line to perform the particular task encoded in the signal. Of course, other vehicle functions may be encoded as is desirable for a particular implementation.

The remote keyless portion of the invention operates in the following manner. When a vehicle operator is in the vicinity of the vehicle, he will activate one of the switches $S_1$ or $S_2$ depending on the function he wishes to be performed, such as unlocking the vehicle doors as he approaches the vehicle, or locking the vehicle doors as he walks away from the vehicle. The unit 12 transmits the coded signal at a high power level on the HI RF data line so that the control unit 28 will be able to receive the signal only if the unit 12 is within a predetermined range (30 feet) of the vehicle. Depending on which of the function switches have been pressed, the microprocessor 14 will cause a data bit sequence stored in the microprocessor 14 that includes a transmitter identification code and a function code of the switch activated to be output on the HI RF data output line. The RF data bit signal will be imposed on the carrier frequency generated by the RF oscillator circuit 20. The antenna 22 will broadcast the coded carrier frequency signal to be received by the antenna 30. The RF receiver circuit 32 separates the data bits from the carrier frequency and applies the data bits to the microprocessor 34. The microprocessor 34 compares the received data bit sequence to stored data bit sequences in the EEPROM 36 to determine if a valid signal for a particular vehicle function has been received. If the microprocessor 34 determines that a valid signal has been received, the microprocessor 34 will cause the appropriate output signal to be administered to cause the desired function.

Because the microprocessor 14 is included within the head of the ignition key, space constraints are a concern. Therefore, the microprocessor 14 includes the necessary storage area within the microprocessor 14 to store the data bits. Because space constraints are not that critical within the vehicle, the microprocessor 34 does not include the EEPROM 36, but the EEPROM 36 is a separate unit. Therefore, the microprocessor 34 can be a less expensive device than the microprocessor 14.

The system 10 further includes a drive-away prevention security system according to a preferred embodiment of the present invention. The drive-away prevention security portion of the system 10 includes a coil $L_1$ within the unit 12, and therefore is included within the ignition key. A steering lock assembly unit 42 is also included as part of the drive-away prevention security portion of the system 10. The assembly unit 42 is configured in combination with an ignition switch (not shown in FIG. 1) associated with the vehicle, as will become more apparent from the discussion below. The assembly unit 42 includes an oscillator circuit 44 that is activated by a signal from the microprocessor 34. The oscillator circuit 44 generates a frequency signal that is applied to a coil $L_2$. The oscillator circuit 44 is shown as a 133 KHz oscillator, but other oscillators operating at different frequencies may be equally applicable.

When the ignition key is inserted into the ignition switch of the vehicle, an ignition signal is applied to the microprocessor 34. When the microprocessor 34 receives the ignition signal, the microprocessor 34 outputs a signal to the oscillator circuit 44 that is switched on and off in accordance with a data scheme stored in the EEPROM 36. Each time the oscillator circuit 44 is switched on, the coil $L_2$ is energized. When the coil $L_2$ is energized, it generates a time-varying magnetic field M that encompasses the coil $L_1$ within the ignition key, as shown. In this manner, power is inductively coupled to the coil $L_1$ in accordance with the time-varying field generated by the coil $L_2$. The coil $L_2$ is shown to have larger coil rings than the coil $L_1$ because the coil $L_2$ is wrapped around the ignition switch, and the coil $L_1$ is within the ignition key.

The induced power signal on the coil $L_1$ charges a capacitor $C_1$ through a rectifying diode $D_2$. The charge stored in the capacitor $C_1$ is applied to the power input pin of the microprocessor 14 in order to provide the operating voltage $V_{cc}$ to the microprocessor 14. This enables the microprocessor 14 to be powered when the ignition key is inserted into the ignition switch even if the battery 16 is unable to provide the necessary power to the microprocessor 14. The capacitor $C_1$ is relatively large and has a relatively large time constant so as to store a relatively high amount of charge, and thus be able to maintain $V_{cc}$ at a substantially constant potential regardless of the voltage swings at the coil $L_1$ as a result of the time-varying field generated by the coil $L_2$. The rectifying diodes $D_1$ and $D_2$ prevent power from the battery 16 from reaching the coil $L_1$ and power from the coil $L_1$ from reaching the battery 16, and provide discrimination in that the larger voltage potential from the battery 16 or the coil $L_1$ is applied to the microprocessor 14.

The time-varying voltage potential generated by the coil $L_1$ is also applied to a start/enable input pin of the microprocessor 14 through a rectifying diode $D_3$. As the microprocessor 34 switches the signal to the oscillator circuit 44 on and off in accordance with the stored data bit scheme in the EEPROM 36, the data bit scheme is transferred to the start/enable input pin of the microprocessor 14 by the inductive coupling between the coils $L_1$ and $L_2$, as discussed above. A capacitor $C_2$ and a resistor $R_1$ combine to have a relatively short time constant so that the start/enable input pin of the microprocessor 14 goes sufficiently high and low in accordance with the on and off signal from the microprocessor 34. The microprocessor 14 decodes the data bits applied to the start/enable input pin, and compares the data bits to a code stored in the memory of the microprocessor 14. If the coded bits do not match the stored bits, the microprocessor 14 takes no action. However, if the data bits applied to the start/enable input pin match the data bits stored in the microprocessor 14, the microprocessor 14 will transmit the identification code to the oscillator circuit 20 as discussed above for the remote keyless entry system. In this case, the RF data bits are applied on the LO power input line to the oscillator circuit 20 because the ignition key is in very close proximity to the unit 28. Low power RF data is transmitted to minimize the range in order to prevent undesirable reception by a would-be or potential thief. The data bits are transmitted on the carrier frequency by the antenna 22, and received by the antenna 30 to be separated by the RF receiver circuit 32. The microprocessor 34 deciphers the data bits from the RF receiver circuit 32, and if a valid data bit signal is received, the microprocessor 34 causes a start or enable signal to be applied to an electronic engine module (EEM) (not shown) to allow the vehicle to be activated. When the microprocessor 34 receives a valid signal, it will discontinue transmitting the on/off signal to the unit 42.

As mentioned above, the unit 12 is encapsulated within the head of an ignition key, and the unit 42 is configured in combination with a steering lock assembly associated with the vehicle. FIG. 2 shows a blown-apart side view of a key assembly 50 including an ignition key 52, a steering lock assembly 54 and a bobbin assembly 56. The ignition key 52 includes a head portion 58 and a key portion 60. Although not shown in FIG. 2, it will be understood that the head portion 58 of the key 52 encapsulates the components of the unit 12 as discussed above with reference to FIG. 1. The coil $L_1$ is shown as a coil 62 at the base of the head portion 58 proximate to the key portion 60 to show how it is aligned to be inductively coupled with the coil $L_2$.

The steering lock assembly 54 includes an outer housing 64 having a non-metallic insulating cover ring portion 66 at one end that is in close proximity to the head portion 58 when the ignition key 52 is inserted within the steering lock assembly 54. The steering lock assembly 54 further includes a cylindrical portion 68 extending from the ring portion 66. A series of protrusions 70 at an end of the cylindrical portion 68 opposite to the ring portion 66 are provided to secure the steering lock assembly 54 to a vehicle structure (not shown) as is well understood in the art. The steering lock assembly 54 is a conventional steering lock assembly in the art. When the ignition key 52 is inserted into the steering lock assembly 54, the ignition key 52 engages an ignition switch (not shown) within the housing 64 so as to cause the vehicle to start when the ignition key 52 is rotated in the conventional manner.

The bobbin assembly 56 is configured as a ring assembly such that the bobbin assembly 56 is slidably engageable onto the cylindrical portion 68 of the steering lock assembly 54. The bobbin assembly 56 includes a bobbin 74 formed of molded plastic having a front plate 76 and a back plate 78 separating a cylindrical portion 80 (see FIG. 3(b)). The inductor $L_2$ is shown here as a coil 82 wound on the cylindrical portion 80 of the bobbin 74. A printed circuit board 84 is mounted to the back plate 78 of the bobbin 74 such that surface mounted components 86 extend from the board 84 opposite to the plate 78. The components 86 represent the electrical circuit components that make up the oscillator circuit 44, and are shown here as components merely for diagrammatic purposes. A two-pin connector 88 is connected to the printed circuit board 84. A DC signal wire 90 and a ground wire 92 are electrically connected to the 2-pin connector 88 in order to provide the power to energize the oscillator circuit 44. The signal wire 90 is connected to the microprocessor 34 to operate the oscillator circuit 44 as discussed above. An output of the oscillator circuit 44 is connected to the coil 82 at a pin connection 94.

The bobbin assembly 56 is slidably engageable onto the cylindrical portion 68 such that the front plate 76 rides flush against a back surface of the ring portion 66. Therefore, when the ignition key 52 is inserted within the steering lock assembly 54, the coil 62 is positioned adjacent to the coil 82, but is separated by free space and the insulative ring portion 66. Magnetic field lines generated by the coil 82 are transmitted through the ring portion 66 in order to energize the coil 62.

FIGS. 3(a) and 3(b) show a front view and a side view, respectively, of the bobbin 74. A series of spring tab projections 98 that include hooked ends are provided for securing the printed circuit board 84 to the bobbin 74 so that the surface mounted components extend from the back plate 78 of the bobbin 74. The cylindrical portion 80 is shown without the coil 82 wound thereon. In one example, the coil 82 is wound on the cylindrical portion 80 with 20 turns of no. 28 AWG wire. Two terminal pins 100 are shown where the terminal connector 88 is connected thereto.

FIG. 4 shows a front view of the printed circuit board 84. The components 86 are surface mounted on a front surface of the printed circuit board 84. A series of three slots 102 accept the spring tab projections 98 such that the hooked ends engage a surface of the printed circuit board 84 in order to secure the printed circuit board 84 to the bobbin 74 to form the bobbin assembly 56. A slot 104 engages a tab (not shown) on the cylindrical portion 68 so as to prevent the bobbin assembly 56 from rotating on the steering lock assembly 54.

A foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A security system for preventing unauthorized activation and for providing remote function actuation of a vehicle, the system comprising:

a fob transmitter for transmitting coded signals to prevent unauthorized activation and for providing remote function actuation of the vehicle having an initiation signal, said fob transmitter comprising:

a first microprocessor for generating a first coded signal to remotely actuate a function within the vehicle; and for generating a second coded signal, to secure the vehicle, in response to receiving a power signal;

a first coil for receiving said power signal;

a first circuit for transmitting said first and second coded signals;

a receiver for receiving said coded signals to prevent unauthorized activation of the vehicle, and for initiating actuation of a vehicle function remotely, said receiver comprising:

a second circuit for receiving said first and said second coded signal;

a second coil for coupling with said first coil to transmit said power signal to said first coil in response to receiving the initiation signal; and a second microprocessor for determining the validity of said received first coded signal, and for initiating the function remotely being actuated within the vehicle if said received first coded signal is valid; and for determining the validity of said received second coded signal, and for securing the vehicle by generating an activation signal if said received second coded signal is valid.

2. The system of claim 1, wherein said power signal comprises a third coded signal, said first microprocessor receiving said third coded signal, comparing said third coded signal with a stored code, and generating said second coded signal if said third coded signal is valid.

3. The system of claim 2, wherein said fob transmitter further comprises:

a first impedance for receiving said power signal having a relatively long time constant so as to provide a substantially constant power signal to said first microprocessor; and a second impedance for receiving said power signal having a relatively short time constant so as to enable said first microprocessor to decode said second coded signal.

4. The system of claim 1, wherein said first microprocessor is powered by said power signal for the purposes of generating and transmitting said second coded signal if said first and second coils are coupled together.

5. The system of claim 1, wherein said first coil, said first microprocessor, and said first circuit of said fob transmitter are configured within an ignition key associated with the vehicle.

6. The system of claim 1, wherein said second coil and said second circuit are configured on a bobbin assembly positioned around a steering lock assembly associated with the vehicle.

7. The system of claim 6, wherein said first coil, said first microprocessor, and said first circuit of said fob transmitter are configured within an ignition key associated with the vehicle;

said second coil and said second circuit are configured on a bobbin assembly positioned around a steering lock assembly associated with the vehicle; and said second coil is wound on a bobbin associated with said bobbin assembly and electrical components associated with said first circuit are mounted to a plate of said bobbin such that when said ignition key is inserted into the ignition key assembly, said first and second coils are in close proximity to each other and are separated by an insulated ring associated with said steering lock assembly.

8. The system of claim 1, wherein said first coil, said first microprocessor, and said first circuit of said fob transmitter are configured within a remote transponder unit; and said remote transponder unit comprises a function switch for activating a particular vehicle function, said first coded signal comprises a function coded signal, and said second microprocessor initiates said particular vehicle function upon determining if said first coded signal and said function coded signal are valid.

9. A security system for providing vehicle drive-away prevention and remote actuation of a vehicle function, the vehicle having an activation signal, and the security system comprising:

a remote fob transponder for transmitting coded signals to remotely actuate the vehicle function, and for transmitting coded signals to prevent unauthorized activation, said remote fob transponder comprising:

a first coil for receiving a power signal, said power signal comprising an ID coded signal;

a first microprocessor for generating a first coded signal to remotely actuate the vehicle function; and for determining the validity of said ID coded signal, and for generating a second coded signal, in response to said ID coded signal being valid, to secure the vehicle and provide drive-away prevention;

a function switch for causing said first microprocessor to combine a vehicle function coded signal reflecting the vehicle function to be remotely actuated with said first coded signal;

a first oscillating circuit for imposing said first and second coded signals onto a carrier frequency, and for transmitting said first and second coded signals;

a transceiver for receiving coded signals to prevent unauthorized activation of the vehicle, and for initiating actuation of a vehicle function, said transceiver comprising:

a second oscillator circuit for receiving said first and second coded signals, and for removing said carrier frequency from said first and second coded signals;

a second coil for coupling with said first coil to transmit said power signal to said first coil in response to receiving the activation signal;

a second microprocessor for comparing said received first coded signal with a first stored code to determine the validity of said received first coded signal, and for initiating the function remotely being actuated within the vehicle if said received first coded signal is valid; and for generating said ID coded signal with said power signal, for comparing said received first coded signal with a second stored code to determine the validity of said second coded signal, and for generating an ignition signal to secure the vehicle if said second coded signal is valid.

10. The system of claim 9, wherein said first microprocessor is powered by said power signal for the purposes of generating and transmitting said second coded signal if said first and second coils are coupled together.

11. The system of claim 10, wherein said remote fob transponder further comprises:

a first impedance for receiving said power signal having a relatively long time constant so as to provide a substantially constant power signal to said first microprocessor; and a second impedance for receiving said power signal having a relatively short time constant so as to enable said first microprocessor to decode said second coded signal.

12. The system of claim 9, wherein said first coil, said first microprocessor, and said first circuit of said fob transmitter are configured within an ignition key associated with the vehicle;

said second coil and said second circuit are configured on a bobbin assembly positioned around a steering lock assembly associated with the vehicle; and said second coil is wound on a bobbin associated with said bobbin assembly and electrical components associated with said first circuit are mounted to a plate of said bobbin such that when said ignition key is inserted into the ignition key assembly, said first and second coils are in close proximity to each other and are separated by an insulated ring associated with said steering lock assembly.

13. The system of claim 9, wherein said remote fob transponder comprises a plurality of function switches, each function switch of said plurality enabling first microprocessor to transmit a different function data bit code within said first coded signal to enable said second microprocessor to perform different vehicle functions.

14. The system of claim 9, wherein said first coil, said first microprocessor, and said first circuit of said fob transmitter are configured within a remote transponder unit; and said remote transponder unit comprises a function switch for activating a particular vehicle function, said first coded signal comprises a function coded signal, and said second microprocessor initiates said particular vehicle function upon determining if said first coded signal and said function coded signal are valid.

15. A remote function actuation and drive away prevention security system for a vehicle having an activation signal, the system comprising:

an ignition key remote fob transponder for transmitting coded signals to remotely actuate a vehicle function, and for transmitting coded signals to prevent unauthorized activation of the vehicle, said ignition key remote fob transponder comprising:

a first coil for receiving a power signal, said power signal comprising an ID coded signal;

a first microprocessor for generating a first coded signal to remotely actuate the vehicle function; and for determining the validity of said ID coded signal, and for generating a second coded signal, in response to said ID coded signal being valid, to secure the vehicle and provide drive-away prevention;

a remote function switch for causing said first microprocessor to combine a vehicle function coded signal reflecting the vehicle function to be remotely actuated with said first coded signal; and a first oscillating circuit for imposing said first and second coded signals onto a carrier frequency, and for transmitting said first and second coded signals; and an ignition assembly transceiver unit for receiving coded signals to prevent unauthorized activation of the vehicle, and for initiating actuation of the vehicle function, said transceiver unit comprising:

a bobbin assembly comprising:

a second oscillator circuit for receiving said first and second coded signals, and for removing said carrier frequency from said first and second coded signals; and a second coil, wound around a bobbin, for coupling with said first coil to transmit said power signal to said first coil in response to receiving the activation signal; and a second microprocessor for comparing said received first coded signal with a first stored code to determine the validity of said received first coded signal, and for initiating the function remotely being actuated within the vehicle if said received first coded signal is valid; and for generating said ID coded signal with said power signal, for comparing said received first coded signal with a second stored code to determine the validity of said second coded signal, and for generating an ignition signal if said second coded signal is valid; and an ignition switch system, having said bobbin assembly positioned thereabout for receiving said ignition signal to secure the vehicle.

16. The system of claim 15, wherein said first microprocessor is powered by said power signal for the purposes of generating and transmitting said second coded signal if said first and second coils are coupled together.

17. The system of claim 15, wherein said ignition key remote fob transponder further comprises:

a first impedance for receiving said power signal having a relatively long time constant so as to provide a substantially constant power signal to said first microprocessor; and a second impedance for receiving said power signal having a relatively short time constant so as to enable said first microprocessor to decode said second coded signal.

18. The system of claim 15, wherein said ignition key remote fob transponder comprises a plurality of function switches, each function switch of said plurality enabling first microprocessor to transmit a different function data bit code within said first coded signal to enable said second microprocessor to perform different vehicle functions.

19. The system of claim 15, wherein said remote transponder unit comprises a function switch for activating a particular vehicle function, said first coded signal comprises a function coded signal, and said second microprocessor initiates said particular vehicle function upon determining if said first coded signal and said function coded signal are valid.

* * * * *